(12) United States Patent
Stering et al.

(10) Patent No.: US 8,074,283 B2
(45) Date of Patent: Dec. 6, 2011

(54) METHOD AND SYSTEM FOR SECURELY PROTECTING DATA DURING SOFTWARE APPLICATION USAGE

(75) Inventors: Ronald J. Stering, Orlando, FL (US); William N. Peach, Ashland, MA (US)

(73) Assignee: SCI Group, Inc., Horseshoe Bay, TX (US)

( * ) Notice: Subject to any disclaimer, the term of this patent is extended or adjusted under 35 U.S.C. 154(b) by 755 days.

(21) Appl. No.: 12/088,070

(22) PCT Filed: Jul. 10, 2006

(86) PCT No.: PCT/US2006/026587
§ 371 (c)(1),
(2), (4) Date: Mar. 25, 2008

(87) PCT Pub. No.: WO2008/008053
PCT Pub. Date: Jan. 17, 2008

(65) Prior Publication Data
US 2008/0229394 A1    Sep. 18, 2008

(51) Int. Cl.
*G06F 21/00* (2006.01)
(52) U.S. Cl. .......................................... 726/26; 726/22
(58) Field of Classification Search ................... None
See application file for complete search history.

(56) References Cited

U.S. PATENT DOCUMENTS

| 5,519,780 A * | 5/1996 | Woo et al. ...................... 725/137 |
| 5,915,086 A * | 6/1999 | Buzsaki et al. ................. 726/28 |
| 2005/0102374 A1* | 5/2005 | Moragne et al. .............. 709/217 |

* cited by examiner

*Primary Examiner* — Nasser Moazzami
*Assistant Examiner* — Ghazal Shehni
(74) *Attorney, Agent, or Firm* — Hulsey, P.C.; William N. Hulsey, III; Loren T. Smith (57) ABSTRACT

Techniques for use in enterprise and similar computing systems securely protect data during software application use by generating private table seeds as a function of a predetermined parameters and private tables as a function of the private table seeds. Each of the private tables associates with a distinct one of the private table seeds, each of the private tables associates with a site. An enterprise table seed is formed using other parameters and an enterprise table is derived from the enterprise table seed. The enterprise table permits data communication throughout an enterprise. A string of characters allows accessing a global private information protection system which includes global tables for integrating the private tables, the enterprise tables, and the global tables into a runtime application program at a remote location and coordinating the user's use to control assure only secure use and prevent inadvertent disclosure of the protected information.

4 Claims, 8 Drawing Sheets

```
bin_ovl_str = byte(0)/*So it will ALWAYS be a positive number*/
            ‖ substr(password,6,1)
            ‖ substr(customer_id_str,4,1)
            ‖ substr(password,1,1);
seed        = bin_31;

call generate_table(ALPHA_INDEX_TABLE, seed, kript_ptr);
call store_table(1 + delta , kript_ptr);

call generate_table(ASCII_INDEX_TABLE, seed, kript_ptr);
call store_table(3 + delta , kript_ptr);

call generate_table(ALPHA_INDEX_TABLE, seed, kript_ptr);
call store_table(2 + delta , kript_ptr);

call generate_table(ASCII_INDEX_TABLE, seed, kript_ptr);
call store_table(4 + delta , kript_ptr);
```

FIG. 7

```
bin_ovl_str = byte(0)
            ‖ substr(password,2,1)
            ‖ substr(customer_id_str,1,1)
            ‖ substr(password,3,1);
seed        =bin_31;
```

FIG. 8

```
call generate_table(RANDOM_TABLE, seed, kript_ptr);
call store_table(7 + delta , kript_ptr);

call generate_table(RANDOM_TABLE, seed, kript_ptr);
call store_table(5 + delta , kript_ptr);

call generate_table(RANDOM_TABLE, seed, kript_ptr);
call store_table(8 + delta , kript_ptr);

call generate_table(RANDOM_TABLE, seed, kript_ptr);
call store_table(6 + delta , kript_ptr);
```

FIG. 9

```
keyval_str =
        hex(rank(substr(customer_id_str,4,1)), 2)
        || hex(rank(substr(password,6,1)), 2);
keyval_str = keyval_str
        || reverse(hex((private_tag), 2));
keyval_str = keyval_str
        || hex(rank(substr(password,2,1)), 2)
        || hex(rank(substr(customer_id_str,1,1)), 2)
        || reverse(hex(rank(substr(password,1,1)), 2))
        || hex((interchange_tag), 2);
keyval_str = keyval_str
        || reverse(hex(rank(substr(password,5,1)), 2))
        || hex(rank(substr(customer_id_str,2,1)), 2)
        || hex(rank(substr(password,3,1)), 2)
        || hex(rank(substr(customer_id_str,3,1)), 2)
        || hex(rank(substr(password,4,1)), 2);

if interchange_sw
then do;
        keyval_str = 'z' || keyval_str;
        call emit3 ('%replace XCHG_TAG_TYPE           by'
        || ltrim((interchange_tag)) || ';') ;
        call emit3('declare ' || keyval_str );
        call emit3('    char(32) var ext static init ('||
          QUOTE || 'rV' || ltrim((runtime_version))
          ||' '|| table_time_str || QUOTE || ');');
end;
else do;
        keyval_str = 'V' || keyval_str;
        call emit3 ('%replace MY_TAG_TYPE             by'
        || ltrim((private_tag)) || ';') ;
        call emit3('declare ' || keyval_str );
        call emit3('    char(32) var ext static init ('||
          QUOTE || 'rV' || ltrim((runtime_version))
          ||' '|| table_time_str || QUOTE || ');');
        end;
```

FIG. 10

METHOD AND SYSTEM FOR SECURELY PROTECTING DATA DURING SOFTWARE APPLICATION USAGE

FIELD

The disclosed subject matter relates to data processing systems and processes, such as may find use in networked computer systems for processing secure data across and within enterprises, as well as similar applications wherein the protection of data from unauthorized use and disclosure is of great importance. More particularly, this disclosure relates to a novel and improved method and system for securely protecting specified data during software application use.

DESCRIPTION OF THE RELATED ART

The U.S. Federal Trade Commission (FTC) has recently stated that over 30 million Americans have been victims of identity theft in the last five years. Identity theft (or identity fraud) is a term frequently used to describe the harmful act by deliberately impersonating an individual. According to an FTC survey, recent identity theft losses to businesses and financial institutions have totaled as much as $48 billion per year, and consumer victims have reported $5 billion in out-of-pocket expenses. This information has compelled federal, state, and local law enforcers, the business community, and consumers to work together to combat this menace.

Most commonly, identity theft relates to credit card fraud, although mortgage fraud and gaining access to the finances of a specified targeted person are comfortably within the meaning of the phrase. Less commonly, identity theft may enable acts of illegal immigration, terrorism, espionage and even allowing the thief to change his identity permanently. Identify theft may also be a means of blackmail, especially if medical privacy or political privacy has been breached, and if revealing the activities undertaken by the thief under the name of the victim would have serious consequences, such as loss of job or marriage. While identity theft appears to cover the entire waterfront of crimes committed while pretending to be someone else, it generally concerns situations wherein the person being impersonated has no knowledge of the person pretending to be them, or does not approve of their actions.

To limit the chance of identity theft and similar harmful acts occurring, many companies or other enterprises that handle such sensitive/important data must encrypt or otherwise protect such data from being viewed on a computer screen. By eliminating or substantially limiting the ability to see the sensitive/important data on a screen also eliminates many privacy and security concerns relating to such sensitive/important data.

For example, credit card issuers, such as MasterCard®, VISA®, American Express® and others, demand that enterprises handling credit card information comply with very strict privacy and security policies and procedures. Thus, a retail establishment or Internet company, for example, must engage in stringent processes and institute strong protections in handling credit card information, such as names, addresses, social security numbers, credit card numbers, and other types of private or personal information.

Complicating the problem of assuring the use of tools to prevent the display or access to sensitive/important data, particularly in the financial transactions environment, is the frequent demand that such information be accessible at all times, i.e., 24 hours per day, seven days a week, without exception. Presently, only a select group of rugged and reliable computer manufacturers and software operating systems satisfy this further requirement. Once such manufacturer of computers and associated operating system software is the Stratus® Corporation.

In addition, the Stratus® computer processing environment has become an industry standard for secure and rugged enterprise and industry computer processing capability in situations requiring "always on" processing. In many ways, however, the needs here addressed may apply to other computer processing environments with similar demands. Regardless of the computing system and associated operating system software, no known methods or systems provide the necessary functions of preventing the unnecessary or unauthorized display of sensitive/important data in such environments.

Accordingly, there is a need to encrypt or provide to intermediate and other users in an "always on" fashion such private information in a format that is not readable by the individuals or entities not having the need to read such information.

There is a need for a method and system for securely protecting such sensitive/important data on the Stratus® and similar platforms. Now, some programming tools presently exist for providing encryption functions in such environments. However, such tools are part of the standard set of programming tools provided to all purchasers of the computing systems. So, a programmer may use such tools to write an encryption software program. However, because the encryption tools are provided as part of the operating system programming tool library, reverse engineering of such programs could readily defeat the objectives of such encryption programs.

Another approach to providing the necessary encryption or other protection to the sensitive/important data in an "always on" environment uses a separate computer processing system and associated operating system and encryption application software. Such a separate system may be operated in association with the Stratus® or similar computing environment. These separate systems encrypt and decrypt the sensitive/important data over the communication path. However, they do not provide for the storage of such data either on the separate system or within the Stratus® or similar processing environment. Presently, no known system allows for encrypting/decrypting the sensitive/important data as the systems writes the data to tape or another recording medium. Moreover, the maintenance and cost of such separate systems makes them financially unattractive.

So, a need exists for a method and system for securely protecting data in a computing processing environment, wherein such environment is securely and ruggedly "always on" and wherein such method and system do not call for the installation, use, and/or maintenance of a separate processing hardware and software system.

SUMMARY

Techniques disclosed here are for use in networked computer systems for enterprise and industry-wide computing similar applications to protect data from unauthorized display, use and disclosure. These techniques overcome or substantially eliminate limitations of known approaches of known methods and systems attempting to achieve such purposes.

According to one aspect of the disclosed subject matter, a method and system for use in enterprise and similar computing systems securely protects data during software application use and generates private table seeds as a function of predetermined parameters. Private tables are derived as a function of a set of private table seeds. Each of the private tables associates with a distinct one of the private table seeds and with a predetermined site within a predetermined enterprise. The method and system generate an enterprise table seed as a function of predetermined parameters and an enterprise table as a function of the enterprise table seed. The enterprise table associates with the predetermined enterprise for permitting communication of data throughout the predetermined enterprise. A string of characters allows for accessing a global private information protection system which includes global tables. The method and system integrate the private tables, the enterprise tables, and the global tables into a transparent runtime application layer. The runtime and associated tools coordinate the use of the private tables, the enterprise tables, and the global tables allow use of protected information, thereby assuring only secure use and preventing inadvertent display and/or disclosure of the protected information. Moreover, the disclosed subject matter includes various site-specific software applications for managing, validating, locating encrypted files, and determining whether the here-provided encryption/decryption process may be read or written to at a specific site.

These and other advantages of the disclosed subject matter, as well as additional novel features, will be apparent from the description provided herein. The intent of this summary is not to be a comprehensive description of the claimed subject matter, but rather to provide a short overview of some of the subject matter's functionality. Other systems, methods, features and advantages here provided will become apparent to one with skill in the art upon examination of the following FIGUREs and detailed description. It is intended that all such additional systems, methods, features and advantages be included within this description, be within the scope of the accompanying claims.

BRIEF DESCRIPTIONS OF THE DRAWINGS

The features, nature, and advantages of the disclosed subject matter will become more apparent from the detailed description set forth below when taken in conjunction with the drawings in which like reference characters identify correspondingly throughout and wherein.

DETAILED DESCRIPTION OF THE SPECIFIC EMBODIMENTS

The disclosed subject matter applies to the protection of data during the operation of a networked computer operating system and provides protected access and control of files on a disk as well as via a network of computers. There is, in such systems, the need to make certain that only authorized personnel view such files and the data such files contain. The present system provides a method and system for translating and encrypting individual files so that the sensitive/important data may not be viewed on a screen or other display means.

Figure 1:
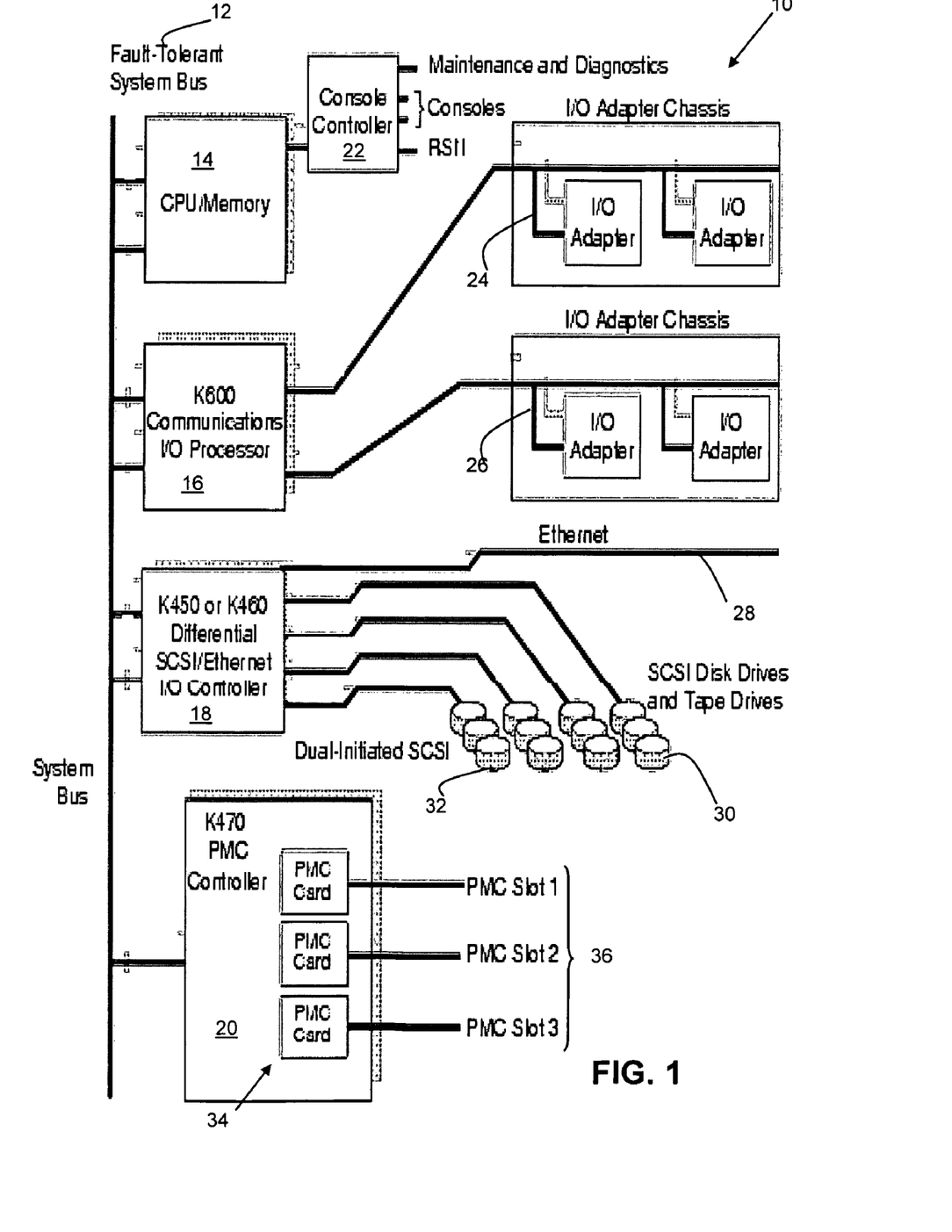
FIG. 1 illustrates computer processing system that may operate in a sensitive/important data environment established by disclosed subject matter.

For depicting the type of computing system that may employ the teachings of the present disclosure, FIG. 1 presents a block diagram of a computing system 10 with which the present embodiment may operate. Computing system 10 may, for example, be based on the Hewlett-Packard® PA-RISC architecture. Such a system may be the Continuum Corporation computer systems, such as the Continuum 600 and 1200 systems, which combine symmetric multiprocessing with continuously available hardware as provided by Stratus Corporation. These systems feature a fault-tolerant system bus 12, along with many customer-installable and maintainable components. Computing system 10, therefore, includes fault-tolerant system bus 12, which interfaces CPU memory 14, communications I/O processor 16, differential SCSI Ethernet I/O controller 18, and PMC controller 20. CPU memory 14 communicates with console controller 22, which controls maintenance and diagnostics, other consoles, and RSN components. Communications I/O processor 16 may interface with I/O adapter chassis 24 and 26 for connections to I/O adapters. Moreover, differential SCSI Ethernet I/O controller 18 may interface with Ethernet 28, SCSI disk drives and tape drives 30, and dual-initiated SCSI 32. PMC controller 20 includes PMC cards 34 for which communications are possible via PMC slots 1 through 3 36.

CPU/memory 14 has globally accessible memory located on small daughterboards, called memory modules. This architecture improves system performance by reducing system-bus traffic and decreasing memory-access time by 25% over conventional CPU/memory architecture. The memory modules, for example, may contain 512 megabytes (MB) or 2 gigabytes (GB) of memory. The CPU/memory 14 can contain up to two memory modules with maximum duplexed memory up to 4 GB.

Computing system 10 may include a Continuum PA-8500 or higher microprocessors (or earlier versions PA-8000 and PA-7100) are based on the Hewlett Packard PA-RISC processors. PA-8500 systems operate at 360 MHz and PA-8600 systems operate at 480 MHz. Both are available on Stratus® equipment in uni-processor or twin processor configurations. Continuum CPU/memory 14 runs lock-stepped in Stratus®'s pair-and-partner, fault-tolerant design. If one CPU/memory board fails, its partner continues to process. Fault-tolerant system bus 12 may consist of two lock-stepped, self-checking buses that perform as one virtual bus. Bus 14 provides a higher degree of data checking than earlier Stratus® buses and has no single point of failure. It supports 64-bit data transfers between CPU/memory boards and 32-bit transfers to the I/O boards. Peak bandwidth is 128 MB/sec. for CPU/memory boards and 76.8 MB/sec. for I/O boards. All data is transferred synchronously to and from the bus transceivers at 24 MHz.

Business enterprises across a broad spectrum of industries and geographies may use computing system 10 with the Stratus® Virtual Operating System (VOS). VOS works seamlessly and transparently with availability, reliability, and serviceability features for continuous availability of mission-critical applications. Open StrataLINK® with TCP/IP software enables Stratus® VOS-based systems to communicate in a standard network environment. Designed as a high-security transaction-processing environment, computing system 10 serves critical online computing tasks. The scalability features of these systems ensure an easy migration and growth path, further protecting online transaction processing (OLTP) applications. Because continuous availability is built into Stratus®' hardware architecture, it is achieved automatically at the application level—without special coding or failover scripting.

In operation, computer system 10 provides simple, direct access to operating system functions such as file and device I/O through the VOS command language with a display form function that gives users a form for every command by displaying command arguments and a range of allowed values. A command-macro facility that offers a command programming capability for creating time-saving tools for system and application tasks.

The presently disclosed system preferably operates as computer system 10 a high-security transaction-processing environment such as that of the Stratus® VOS for critical online computing tasks. The Stratus® VOS preferably combines with Stratus® Continuum 600 and 1200 Series as computer system 10, for example, to provide the advantages of a powerful continuously available computer processing environment. The Stratus® Continuum® 600 and 1200 Series support large critical online applications. The Continuum family combines RISC-based (Reduced Instruction Set Computing), symmetric multiprocessing technology with Stratus® proven continuously available architecture to provide the power to meet critical enterprise needs.

Continuous availability is built into Stratus® hardware architecture without special coding or fail-over scripting. The Stratus® VOS offers a secure programming environment that incorporates an advanced set of development tools. The selection of high-level programming languages available to VOS developers includes C, COBOL, BASIC, PL/1, FORTRAN, and Pascal, with full ANSI-compliant versions of the major programming languages. The Stratus® VOS provides an OpenVOS software platform. Third party open-source technologies enable increased VOS compatibility with open systems technologies.

The Transaction Protection Facility protects the consistency and integrity of data and provides tools for creating and administering a fast and efficient transaction processing system. Stratus® VOS communications software products offer a full range of functionality, including networking, device emulation, and terminal connectivity. Running over phone lines, the RSN forms a continuous direct line between every Stratus® computer and the Stratus® Customer Assistance Centers (CACs).

Figure 2:
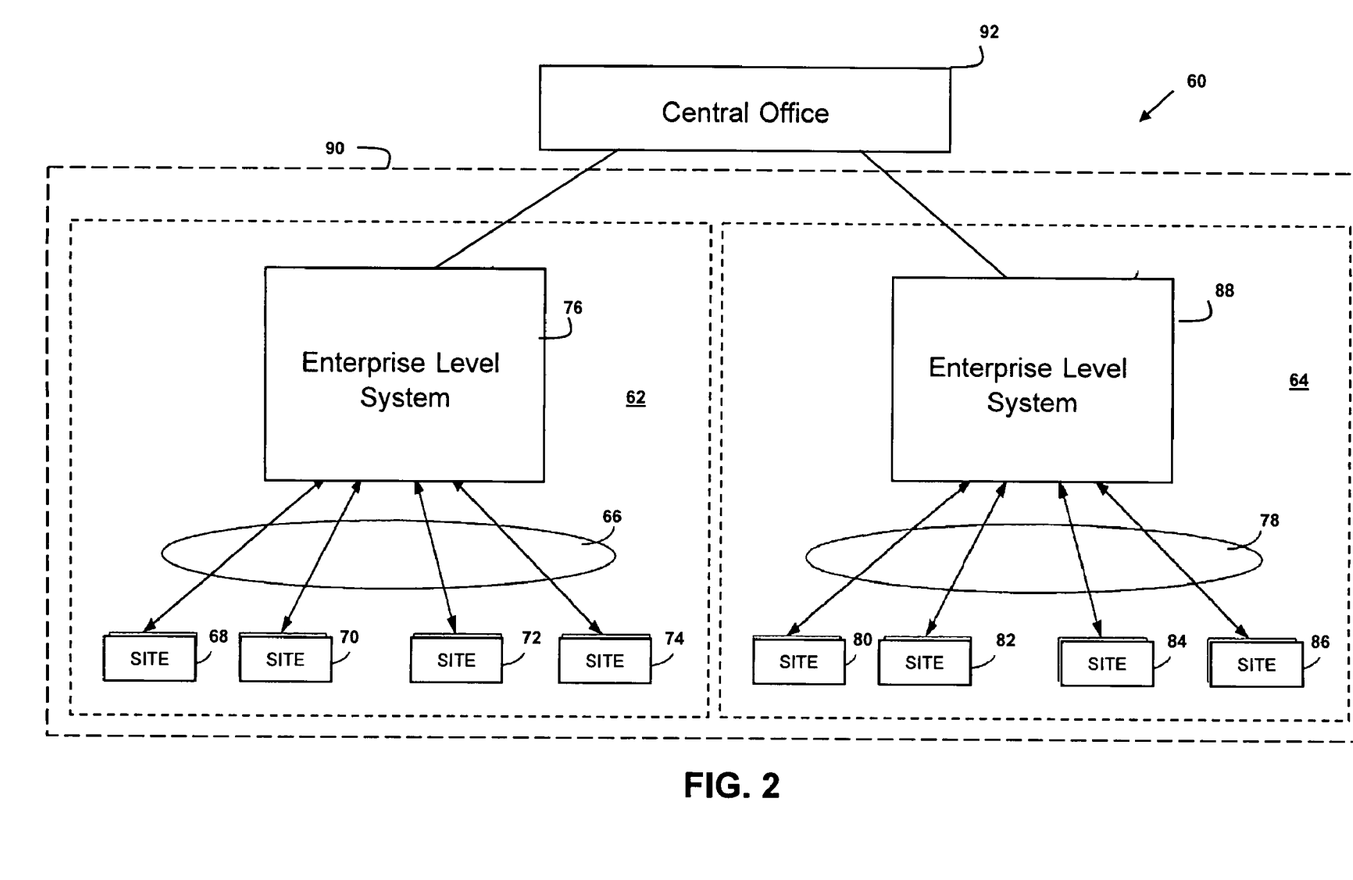
FIG. 2 is a conceptual block diagram of the global, enterprise, and private levels of the sensitive/important data system as per the present teachings.

Having described the basic functional blocks of a computing system capable forming a constituent FIG. 2 is a conceptual block diagram of the global, enterprise, and private levels of the sensitive/important data system as per the present teachings. FIG. 2 illustrates a representative sensitive/important data system 60. Sensitive/important data information system 60 includes supports operations at enterprises 62 and 64. Enterprise network 66 provides a network interface between sites 68, 70, 72, and 74 and enterprise level system 76. Likewise, enterprise network 78 provides an interface between sites 80, 82, 84, and 86 and enterprise level system 88. Within sensitive/important data information system 60, enterprise 62 and 64, for example, provide a network 90 of enterprises that may access central office 92 through the use of a global level of protection. Mainframe computing systems at sites 68 through 74 for enterprise 62 and sites 80 through 84 generate private table seeds as a function of a predetermined parameters and private tables as a function of the private table seeds. Each of the private tables associates with a distinct one of the private table seeds, and each of the private tables associates with a site mainframe computer. At the enterprise 62 and 64 level an enterprise table seed is formed at each enterprise using other parameters and an enterprise table is derived from the enterprise table seed. The enterprise table permits data communication throughout enterprise 62 or 64. A string of characters provided to central office 92 allows accessing central office 92 secure components of the presently disclosed global private information protection system, including global tables for integrating the private tables, the enterprise tables, and the global tables into a runtime application program at central office 92 and coordinating the control of the disclosed system to assure only secure use and prevent inadvertent disclosure of the protected information.

At secure central office 92, each enterprise 62 or 64 receives access to a unique set of runtime encryption/decryption tables. These tables may be integrated in runtime software at central office 92 and are shipped to the customer. The key for these tables, however, are stored in an off-site secure location by the vendor (e.g., SCI Group of Marble Falls, Tex. to which the presently disclosed subject is assigned, or vendor), and not made available to the enterprise. This further enhances the security of the encryption/decryption algorithms. Accordingly, if enterprise 90 or one of the sites develops a problem or loses all copies of the runtime software, central office 92 simply regenerates the runtime using the unique enterprise or site level password data.

Figure 3:
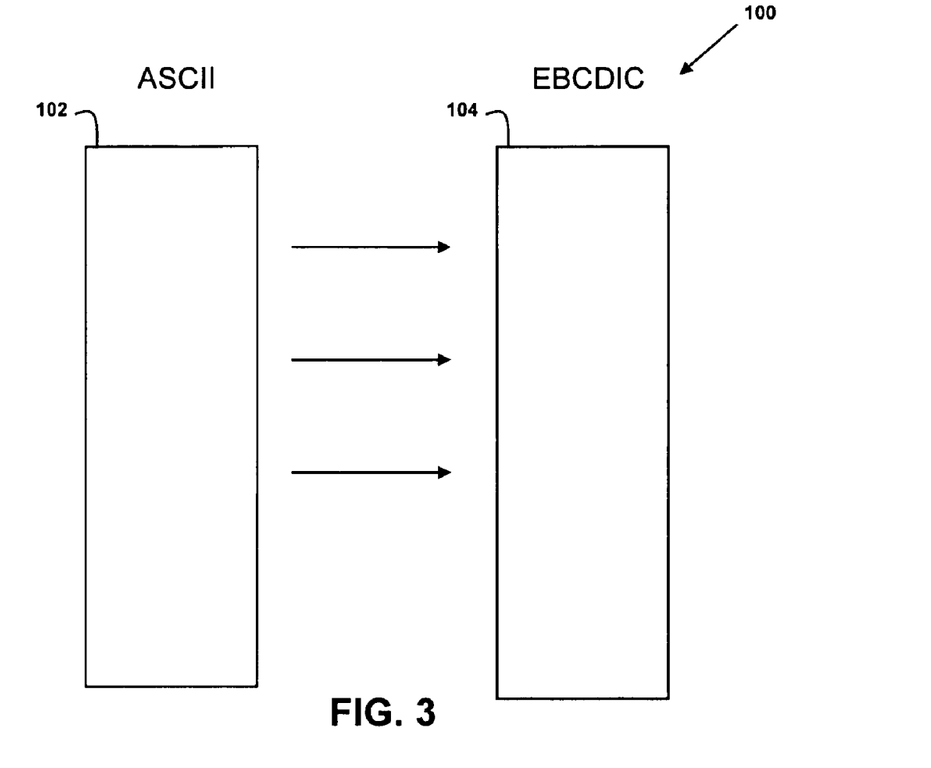
FIG. 3 presents the concept of ASCII to EBCDIC translation as relevant to the present embodiment.

FIG. 3 presents the concept of ASCII-to-EBCDIC translation 100 as relevant to the present embodiment. In many processing environments, such as the Stratus® VOS operating environment, ASCII data 102 is translated to EPSIDIC data 104. The sensitive/important data system of the present disclosure takes advantage of the fact that with this structure, for every byte there are 256 translation options that exist. EBCDIC (extended binary coded decimal interchange code) data 104 is in a standard format of encoded character data, just as is ASCII data 102. EBCDIC data 104 appears in secure environments such as that of the Stratus® VOS environment for performing functions such as clearing checks and is the standard encoding on all IBM® mainframe computers, mini computers, and most computers designed to be compatible with them. Any UNIX type machine has the function of automatic conversion. A lot of switches used EBCDIC, some billing systems were IBM, some custom switches use ASCII.

The conversion of ASCII data 102 to EBCDIC tables 104 results in data records that are 256 bytes long. So, the present disclosure uses tables that are 256 in length. The disclosed subject matter uses non-intuitive logic to seed tables in the ASCII-to-EBCDIC translation process 100. As a result of the present embodiment's ASCII-to-EBCDIC translation process 100, the user never sees the resulting tables. The tables, instead, are all in the runtime files. Moreover, the user does not even receive the tables. As will be clear below, the disclosed system also provides key-to-key integrity, in that users have logic that allow selection of a character, e.g., the letter "C" in an alpha file, and the ability to read sequentially from there.

Figure 4:
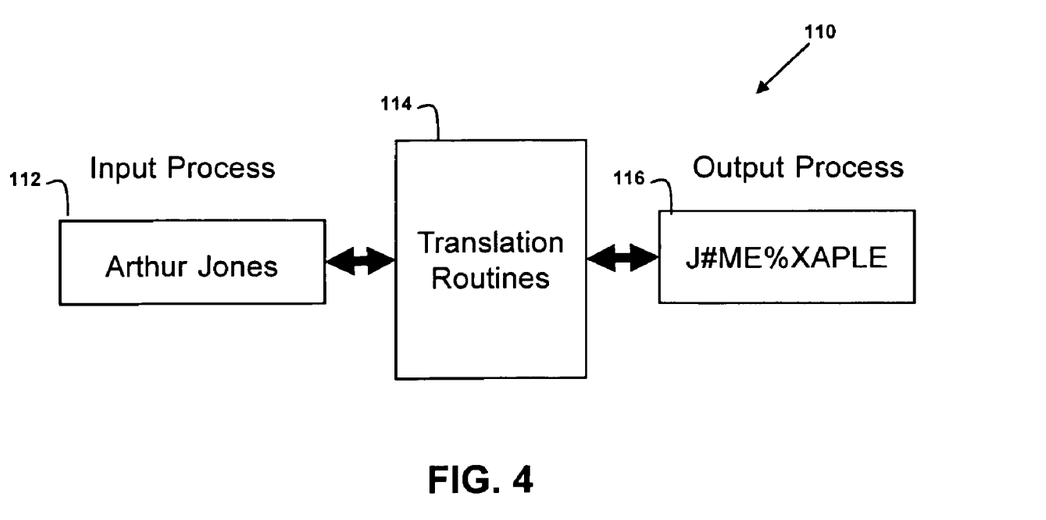
FIG. 4 provides a conceptual representation of the translation functions of the disclosed subject matter.

FIG. 4 provides a conceptual representation of the translation functions 110 of the disclosed subject matter. Given a plain text record 112 of the name "Arthur Jones" that a user enters as an input process, the translation routines 114 of the present disclosure perform the translation here described. The output process, therefore, is to create a translated or encrypted record 116 of "J#ME%XAPLE", which is not intelligible by an unauthorized viewer or user. The present disclosure provides at central office 92 the ability to perform a translation function principally. Moreover, other embodiments may also use encryption processes in conjunction with the translation functions.

The presently disclosed system protects specific information files as those entities responsible for such protection may automatically be required to manage the protection such data. The disclosed subject achieves these results using a secure format in translation routines 114 that readily complies with most privacy and security audit requirements.

Figure 5:
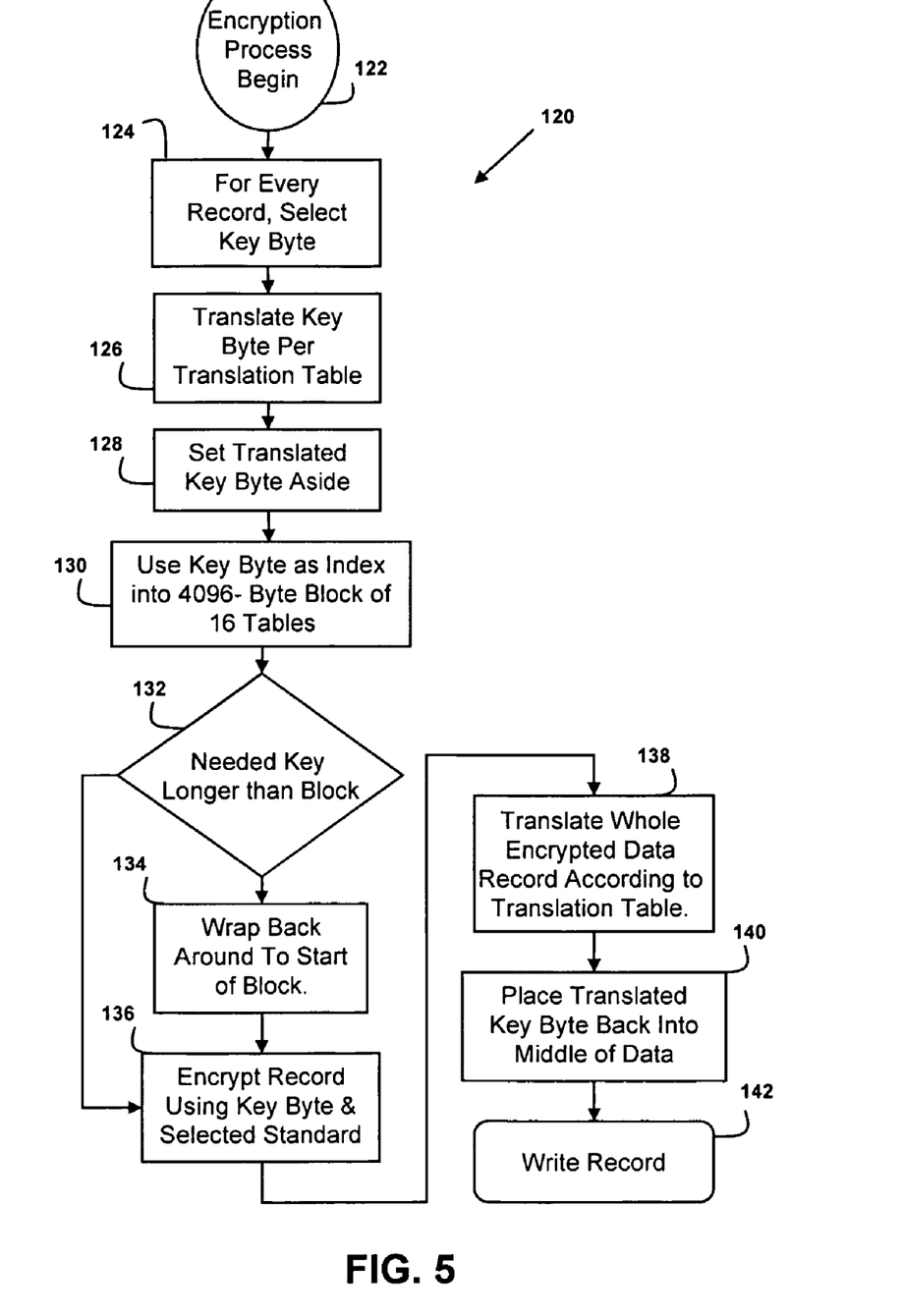
FIG. 5 is a flow diagram of the encryption translation functions of the present disclosure.

FIG. 5 presents flow diagram 120 of the encryption translation functions of the present disclosure. Using runtime software to generate dynamic keys the present system and method generate a set of 16 tables to fill one disk block. Note, however, that the number of tables may vary according to the particular environment or other factors affecting the use of the disclosed method and system, as well as other systems with which the present embodiment or other embodiments may interface. That block is an excellent cipher block, and may be used for generating keys very quickly. Therefore, referring to flow diagram 120 the encryption process begins at step 122. For every record, the process selects, at step 124, a key byte of record length mod by an odd number. Then, at step 126, the process translates that byte according to the translation table. The translated byte then may be set aside for use later, at step 128. At step 130, the process uses the translated byte as a number mod another number as an index into the whole 4096 byte block of 16 tables. The user's key starts there, and is as long as the data record being processed using variable length keys to make the cipher stronger. If the needed key is longer than the block, as query 132 tests, the process wraps back around to the start of the block, at step 134.

Then, the process encrypts the record using the key the disclosed system just generated and the selected standard, at step 136. The process then, at step 138, translates the whole encrypted data record according to the translation table. With this step the present method and system overcomes known cracking techniques. Then, at step 140, the process places the translated key byte back into the middle of the data, because the decryption process needs the translated key byte for regenerating the key. Finally, the process writes the record, at step 142.

Figure 6:
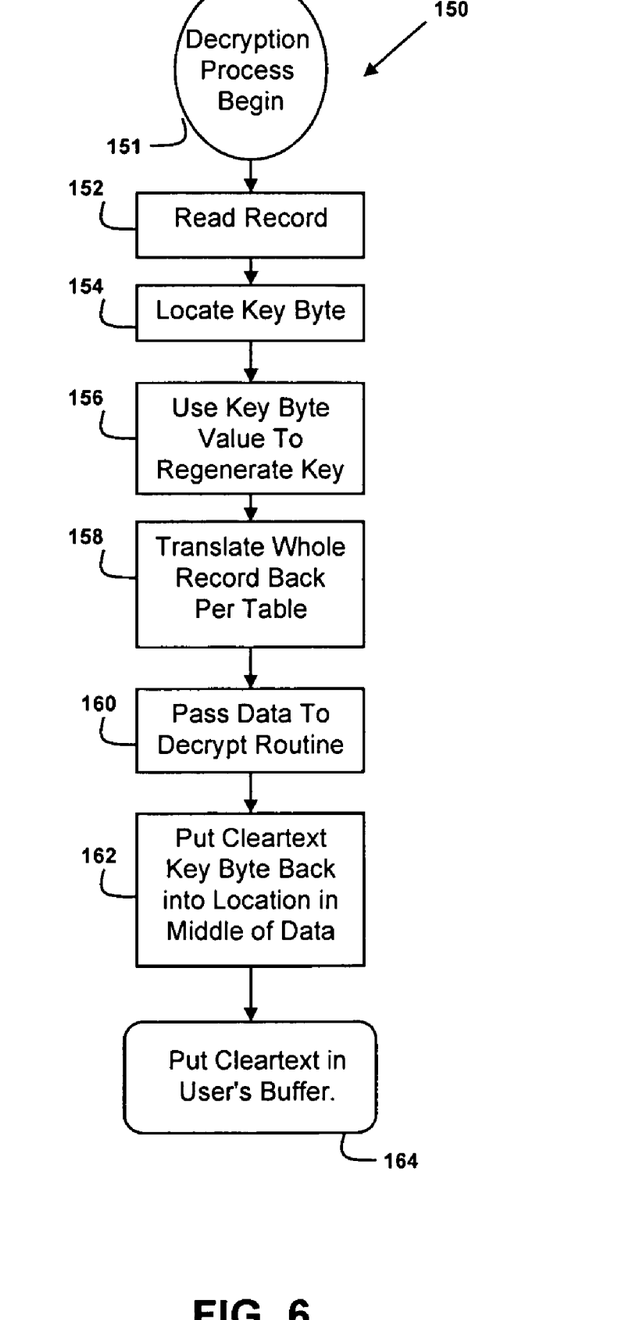
FIG. 6 is a flow diagram of the decryption translation functions of the present disclosure.

FIG. 6 presents flow diagram 150 of the decryption translation functions of the present disclosure. During decrypting, the process reads the encrypted record, at step 152, and then locates the key byte, at step 154. The key byte location process uses the same logic as described above for encryption. The key byte is then used to regenerate the key, at step 156. The decryption steps further include translating the whole record back according to the table, at step 158, and passing the data to the decrypt routine, at step 160. Then, the present embodiment places the clear text key byte back into the appropriate location for such clear text in the middle of the data, at step 162, and into the user's buffer, at step 164.

The present embodiment allows entities responsible for providing high levels of service, commitment to clients, and integrity in the work they perform with such data, to offer a practical and reliable means for protecting information while using a unique set of runtime encryption/decryption tables. The runtime encryption/decryption tables may be bound into the user's applications. The user's applications, when bound with the information protection system runtime, will automatically encrypt data when writing to disk, and decrypt it when reading from disk. This provides enhanced security for the information a user may need or desire to protect. The disclosed method and system go beyond due diligence, automatically and transparently protecting the user's data from unauthorized access.

In the disclosed embodiment, only files converted to files usable to the present information protection system will be encrypted. All other files will continue to be read and written by the user's applications as clear text. That is, the disclosed information protection system works only on files. Communications lines and terminal sessions are never affected.

Information protection system tools for performing the functions here disclosed are located in a secure central office 92 and use a key to provide the user with a unique set of runtime encryption/decryption tables. These tables, integrated in the information protection system runtime software, are not shipped in source or clear text to the user, but in an encrypted form that only the runtime software can understand. This further enhances the security of the encryption/decryption algorithms. If the user develops a problem or loses all copies of the user's runtime, the disclosed system provides the ability to regenerate the runtime using the user's unique password data.

Specific features of the present embodiment include there being no encryption keys or similar data to lose in protecting the data from unauthorized display or disclosure. All information for which protection is sought is concealed in the runtime. Also, no application changes are needed in forming the various tables and protective structures here disclosed. All that is needed is to rebind the application program modules that access information protection system files. As such, a user's protected applications see only clear text.

Any access that does not use the information protection system runtime will see only the encrypted data. Moreover, multiple encryption tables are bound into the runtime. This feature allows the user to set each file with a different encryption table, thereby adding to the provided protection, since files encrypted with different tables are to be decrypted using different tables. The disclosed subject matter, therefore, provides a set of "standard" tables for securely interchanging data with other sites using information protection system.

The present embodiment employs a set of "site-specific" tables that are unique to the user's site. In addition and most distinctly, the information protection system supports indices on information protection system files. Programs bound with the information protection system runtime will only run on designated VOS modules. This adds to the user's security since access to the designated modules provides an additional level of control.

The disclosed method and system provides tools for easy conversion of application data files to information protection system files. These converted files may be re-converted back again if the user decides encryption is not necessary. The user may test the process using any application bound with the information protection system runtime. This allows the user to gain full confidence in the process, and convert files over at the user's own pace.

Each account is supplied with a site identifier, a site password and an enterprise password. The present embodiment assigns a site a particular number for private encryptions and a number for enterprise encryptions. Moreover, all sites receive the same global encryptions.

One embodiment of the present disclosure uses three sets of 16 tables. The first set is here referred to a set of private tables. A site password and the site identifier are used as a seed to generate the first 16 tables. The seed changes after every generation of each table. With the disclosed process, seed generation is deterministic, but obscure. No two sites ever receive any two tables the same, because both the site identifier name and the site-password impact generation of the resulting private tables.

The second set of tables are enterprise tables. An enterprise password is used as a seed to generate this set of enterprise tables. Preferably, any two sites 62 and 64 within an enterprise 90 whose tables were built with the same enterprise password and same enterprise encryption number have the ability to exchange data using the user's second-tier enterprise tables. Without these features in common, exchange of data is not possible.

Global tables, the third set of tables, always use a same secret string. Accordingly, every user gets the same global tables. Any user may read/write files that were encrypted with global tables. This feature, therefore, allows for easy and yet secure interchange.

When building the tables, the disclosed system does not write out the tables directly. The tables are also encrypted, and instructions in the runtime software build the tables in memory during initialization. So, someone seeking to penetrate the system must analyze application memory on a running application to actually see the tables.

When the disclosed system creates an encrypted file, the user may specify a number from 1 to 32, and a level (private, interchange, global) to select which table to use. A command for creating an encrypted file allows users to specify a type of encryption, the system then automatically selects a number that is appropriate if a specific number is not given.

Figure 7:
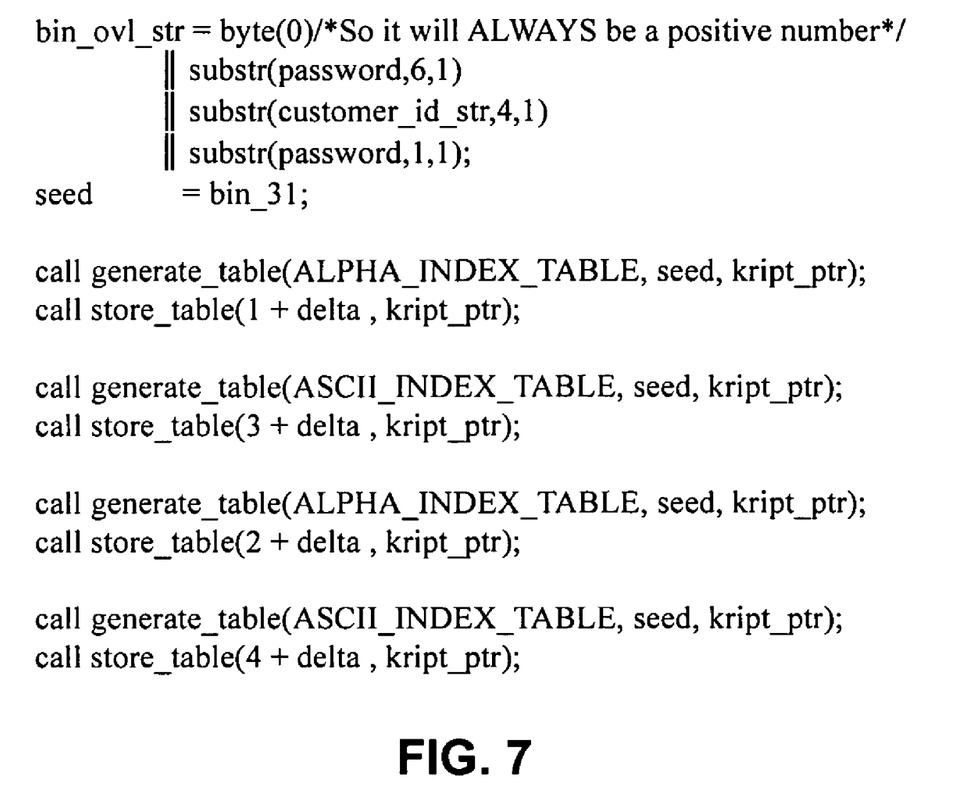
FIGS. 7 through 10 show examples of software instructions for performing the various steps of the present data protection system.

FIGS. 7 through 10 show examples of software instructions for performing the various steps of the present data protection system. Referring to FIG. 7, for each of the three sets of 16 tables, tables 1 through 6 will translate printable ASCII characters into alternate characters for collating correctly according to the alphanumerical collating sequence (AaBbCc . . . ). This permits a user to add a regular Stratus® VOS index to an encrypted file that uses tables 1 to 6, and as long as every byte in a cleartext key is a printable character, the Stratus® VOS index software may then sort every encrypted record stored on disk for that file in the same order as if it were clear text. The disclosed subject matter, therefore, provides the distinct feature of an encryption solution with direct index support.

If there are any non-printable characters in key fields, the data is not lost, but the records will not sort in the cleartext order. Tables 7 and 8 do the same as 1 to 6, but they sort printable characters according to the ASCII sequence ( . . . ABCDE . . . abcde . . . ). Most users wanting index support will be doing AaBbCc collating. Table 9 provides a random table. The order of the changed bytes doesn't factor in whether the cleartext was printable or not. The first nine types are just simple translation. Each character is translated to some other character (including non-printable ones), so the results are unintelligible to view, but persistent hackers may, with great effort, reverse the translation.

Types 10 to 16 specify the type of encryption as a very fast, unpublished, proprietary encryption generating different data encryption keys based on the data in each record. The encryption process uses a key generated from the record to encrypt the data. The decrypt routines know how to generate the same key in a manner that may be not be discerned or cracked using known programs for such processes. This is principally true since such programs seek the use of DES or one of the other published encryption standards. Many such programs may also look for valid ASCII after they are done with each pass of data translation. The process that the disclosed system performs with the data is substantially different from the process of such other programs. Therefore, even if a hacker were to obtain a data files, without the runtime file, it is not possible to derive the original data.

Types 17 through 19 relate to DES1 encryption. That means the disclosed system uses standard DES as an intermediate step, and takes further different steps. For example, DES1 is much more CPU intensive than the presently disclosed encryption process, but any user who seeks a process faster than DES1 may achieve such results with the presently disclosed method and system. Most applications tend to be disk intensive rather than CPU intensive anyways.

Since the disclosed system may perform other proprietary actions with the data after DES1 completes its functions, no known cracking program has the ability to reconstitute the original data. This is true irrespective of how long such a program may operate or how much data such a program may have to work with. Accordingly, the disclosed subject matter provides a completely secure method and system for maintaining the protected state of data files.

Further embodiments of the disclosed system may include types 20 through 32. For example, DES-3 and the newer DEA standards may be embedded in the disclosed system for further enhancements and functionality. Considering that DES3 presently consumes at least three times as much CPU operating capacity as DES1, and more data copying of data occurs during the DES3 encrypted/decrypted processes, there may be limitations with the use of DES3. However, some auditing standards may require the use of DES3. Accordingly, the present method and system may be adapted for such use.

For the future encryption logic, the disclosed system provides the distinct technical advantage of a proprietary layer generating different keys based on the data in the record. As such, each record in a file may be encrypted with a significantly different key than the record before or after it. The less anyone else knows about how the disclosed system generates those keys, the more secure will be the sensitive/important data. Since each encrypted file may specify a different table, a large variety of keys protecting data for any application set is possible.

The present method and system provide excellent protection to fixed, relative, and sequential files, since the key selected is dependent on the record length and on the value of a byte of data within the record, and on the table selected when the file was created. Note that such strong encryption may not be used with stream files, since they have no enforceable record lengths. With such files, the user may read an arbitrary number of bytes from any position in the file.

Effectively, the disclosed process breaks each record into three pieces according to the runtime. A first piece is that portion before the key byte. The next piece is the key byte. Finally, the portion after the key byte is the third piece. Each piece gets encrypted according to different rules. In contrast, a hacking program generally applies the same rules to all data in a file.

Since all commercial packages use a different way of encrypting the bits, known hacking tools will always fail to achieve the user's objectives when working with anything encrypted with the runtime. In fact, such hacking tools may use as many CPU cycles as may be available, however without the runtime and the tables they will always get some other data.

In the disclosed embodiment, encryption/decryption translation occurs as here described. When a file is attached/opened, it is checked to see if it is a (a) a normal file, (b) an encrypted file with a known encryption type, or (c) an encrypted file with an unknown encryption type. Presumably, such checking may occur from a different site, but without the use of a global table. In the event that checking determines the encryption to be an unknown encryption, the runtime stops. Stopping prevents corrupting the encrypted data, since the system does not possess or have access to the correct tables for decrypting the file.

For normal files, the runtime software does no encryption or decryption, thereby leaving the sensitive/important data unchanged. For encrypted files, the runtime software operations for encrypting every buffer being written in its own private buffer and then writing that buffer to disk. For reads, the runtime software operates to decrypt the data read in from disk, and then moves the data to the user's buffer. With such steps, a software application operating in conjunction with the runtime software sees only clear text, whereas the disk data is always encrypted. Any access to the file that does not use the runtime will see only the encrypted data, not the clear text. Any files that are not encrypted may still be used by the operating software application. As such, files that no longer have data needing encryption may be decrypted back to clear text. All of these steps may occur without any application changes, once the runtime software is bound in with the software application.

The disclosed system takes characters from the password and site identifier and converts such characters using overlays to a different data type. The sensitive/important data system then may use the password and site identifier as seeds to an s$unif call in the Stratus® VOS operating system. This generates an obscure, but repeatable, sequence of values used in the generation of tables. If a user loses all copies of the runtime software, but still a tape with encrypted files exists, the disclosed system has the ability to regenerate such tables and lost runtime software using the disclosed tools, as long as the disclosed system possesses the user's site password, site identifier, and enterprise password.

To create the tables here described, the following general types of steps occur. With the present embodiment, tables may come in three types: (a) ascending alpha tables, (b) ascending ASCII tables, and (c) random tables. All three types of tables include certain reserved characters which are the same in the translation table as in the straight ASCII collating sequence. This is true, because the operating system or language runtimes may seek to use such reserved characters as delimiters. Also, each byte in a file may contain an unsigned value between 0 and 255 decimal base. The values that the disclosed embodiment of the system does not change include −255 (because, a block of FFx is considered uninitialized by the file system), −127 through 147 (because, locking shift introducers and other word processing markers), −27/*esc*/, −13/*cr*/, −10/*lf*/, −0/*nul*/.

For the tables which support indexes (i.e., tables 1 to 8), the printable characters are placed in an ordered array that is correct for that collating sequence. All the others are put in a different array and randomized using the permutation derived from the s$unif seed call. The disclosed system then uses additional values in the permutation to merge the ascending array and the randomized array into the table with the values that never change.

Random tables use the same logic, except that all the printable characters are in the randomized array instead of the ascending array. The disclosed system repeats these steps 16 times using different password and site identifier characters in a defined, but an obscure pattern, such as the s$unif seed each time, and the private tables are finished.

The disclosed system then writes the tables to an include file that the runtime srcs include, along with the constants that determine which encryption types this site is allowed to recognize. The tables are converted into a series of values passed to an initialization routine in the runtime. The system builds the tables and checks them for completeness when it runs.

Then, the disclosed system repeats the same process using the enterprise password to derive the enterprise tables. Finally, the process includes the use of a hard-coded global password to generate the desired global tables.

Referring further to FIGS. 7 through 10, it is important to note that the system uses the password and user identifier to form the seed for the tables. The present embodiment changes the seed after generating every set of four tables. With the disclosed process, changing the order that the tables are created or other factors creates an inconsistency or data corruption may result for customer that used the same tag type(s) in their runtime. In constructing the first four tables, there are preferably two alphanumeric tables and two ASCII tables, as FIG. 7 shows.

The disclosed system uses a specific logic set that differs from the DES and other encryption routines. However, the logic here provided may be used in conjunction with the of such encryption routines. When a user engages the disclosed system, central office 92 assigns to the user a user identifier and two sets of passwords. One set of passwords is for the private tables. The second set of passwords is for the enterprise tables. So, as the process goes through to generate the tables.

Figure 9:
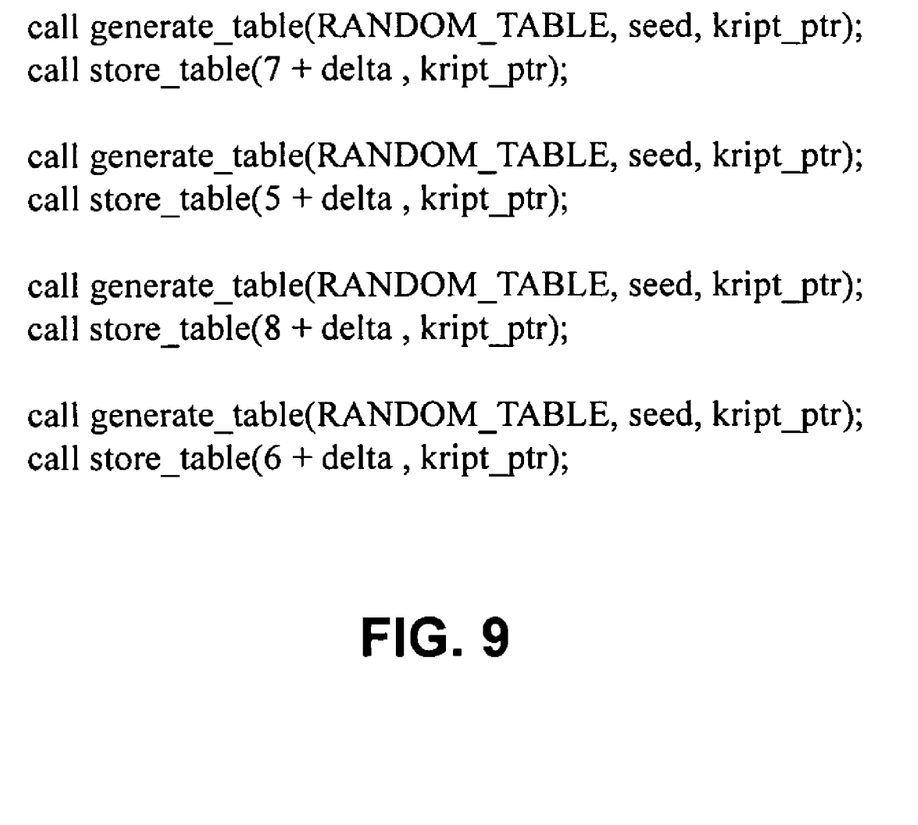

FIG. 7 depicts an exemplary process for generating tables 1 through 4. The steps of FIG. 7 include taking the sixth character of the first password, the fourth character of the user identifier, and then the first character of the second password. For tables 5 through 8, FIG. 9 shows that the process takes the second character of the first password, the first character of the user identifier, and the third character of the second password.

Because of the set routine here described, when a customer receives the runtime file, there is no need for tables to be hard-coded or on a disk. The tables may all be embedded into the software applications that use them and may be generated dynamically. The sequencing of how the tables are generated controls the table generation. By keeping the key on file at central office 92, if a runtime is lost or deleted by some event, central office 92 can simply regenerate the file.

Figure 8:
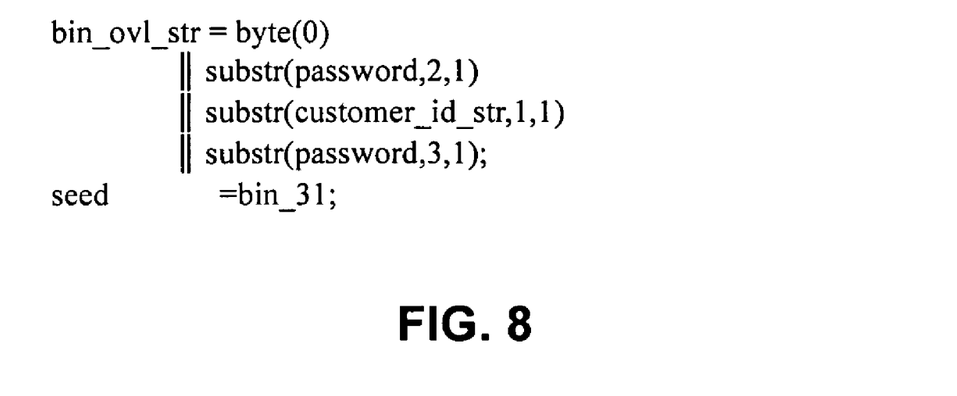
Figure 10:
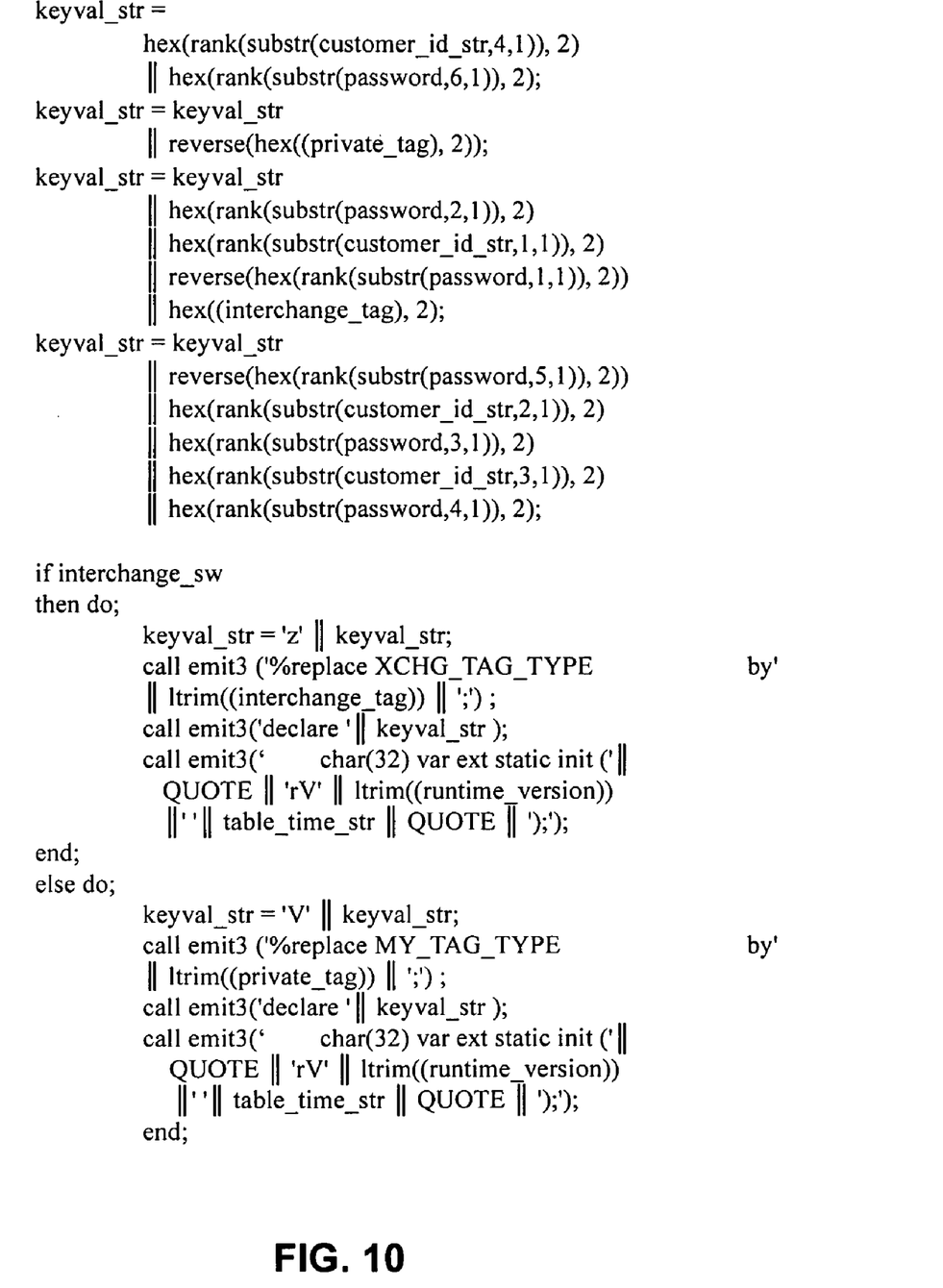

FIG. 8 shows that a new seed is being generated. For the next four tables, as FIG. 9 shows, four randomly generated seeds are used. To make hacking more difficult, the disclosed process writes tables in a permutated order, as FIG. 10 depicts. As such, when the process sorts output including the files, a different order results. In order for the disclosed system to properly operate, the order of the process may not change. In filling the array with the characters that can be randomized, since collation will not support indexes, the only characters to leave out are the ones that have a fixed location, all of which are non-printable.

The disclosed subject matter provides the technical advantage of being able to run on all platforms. The instructions for performing the disclosed process may be easily integrated into many user platforms. Moreover, the use does not maintain the support for the disclosed process.

The disclosed process may be embedded into a piece of software such that every time that someone on a Stratus® application performs a write or read or keyed write or a keyed read, the disclosed subject matter intercepts the calls to the routines and runs it through the translator so it can translate or untranslate.

The software is also intelligent enough so that if an application encrypts or translates a file using different translations, one for each file, the translation may occur. Or, if there is a file that is not encrypted, it will handle that too. In the future, the expansion group of tables, we can translate on a record basis using DES3 or another program using the DES routine. Also, the tables that the disclosed system generates are 256 bytes long. A key aspect of the disclosed subject matter is that each group of 16 tables fits in one block of Stratus® data, which is 4096 bytes long.

If the described process were operating on a platform other than the Stratus® VOS platform, the logic is unique is how the tables are created. If the logic were to be implemented on a platform other than the Stratus® platform, there would be the need to replicate the s$unif call. There may be other Stratus®-specific calls, other s$ calls, which may also need to be replicated. Also, there may be the need to have someone who is used to running on a DEC or Windows operating system to get the shell to intercept the read/write routines to access the logic here provided.

The processing features and functions described herein may be implemented in various manners. For example, other Stratus® platforms, e.g., an older XA/R-series and the newer V-series may use the disclosed subject with a VOS operating system. The disclosed subject matter works well with these other platforms by compiling/binding under those versions of VOS to achieve the appropriate runtime. Furthermore, files encrypted for one platform are decipherable on another platform, as long as the encryption keys are compatible. Moreover, the process and features here described may be stored in magnetic, optical, or other recording media for reading and execution by such various signal and instruction processing systems. The foregoing description of the preferred embodiments, therefore, is provided to enable any person skilled in the art to make or use the claimed subject matter. Various modifications to these embodiments will be readily apparent to those skilled in the art, and the generic principles defined herein may be applied to other embodiments without the use of the innovative faculty. Thus, the claimed subject matter is not intended to be limited to the embodiments shown herein but is to be accorded the widest scope consistent with the principles and novel features disclosed herein.

What is claimed is:

1. A method for securely using and preventing inadvertent disclosure of protected information, comprising the steps of:
    generating a plurality of private table seeds as a function of a plurality of predetermined parameters;
    generating a plurality of private tables as a function of said private table seeds, wherein each of said plurality of private tables associates with a distinct one of said plurality of private table seeds, each of said private tables associating with a predetermined site within a predetermined enterprise;
    generating at least one enterprise table seed as a function of said plurality of predetermined parameters;
    generating an enterprise table as a function of said at least one enterprise table seed, said enterprise table associating with said predetermined enterprise for permitting communication of data throughout said predetermined enterprise;
    establishing a string of characters for accessing a global private information protection system, said global information protection system comprising a plurality of global tables;
    integrating said private tables, said enterprise tables, and said global tables into a runtime application program at a remote location; and
    coordinating the use of said private tables, said enterprise tables, and said global tables to allow use of a predetermined set of protected information, thereby providing for the secure use and preventing inadvertent disclosure of said predetermined set of protected information, wherein the method is executed on a computer.

2. The method of claim 1, further comprising the step of generating each of said plurality of private table seeds as an indirect function of a site password and a site identifier, thereby causing each of said plurality of private tables as each of said sites to be unique for each of said sites.

3. A file-based information protection system for operation in association with a plurality of computer software applications for controlling the secure use and preventing inadvertent disclosure of protected information, comprising:
    a plurality of private table seeds generated as a function of a plurality of predetermined parameters;
    a plurality of private tables generated as a function of said private table seeds, wherein each of said plurality of private tables associates with a distinct one of said plurality of private table seeds, each of said private tables associating with a predetermined site within a predetermined enterprise;
    at least one enterprise table seed generated as a function of said plurality of predetermined parameters;
    an enterprise table generated as a function of said at least one enterprise table seed, said enterprise table associating with said predetermined enterprise for permitting communication of data throughout said predetermined enterprise;
    a string of characters for accessing a global private information protection system, said global information protection system comprising a plurality of global tables;
    software instructions for integrating said private tables, said enterprise tables, and said global tables into a runtime application program at a remote location;
    software instructions for coordinating the use of said private tables, said enterprise tables, and said global tables to allow use of a predetermined set of protected information, thereby providing for the secure use and preventing inadvertent disclosure of said predetermined set of protected information; and
    a computer for executing at least one of said sets of software instructions.

4. A networked computer processing system for operation with a plurality of networked software applications and having the ability to securely use and prevent inadvertent disclosure of protected information, the networked computer processing system comprising:
    a computer network for interconnecting a hosting location with at least one enterprise, said computer network further connecting to a plurality of sites associated with said enterprise;
    means for generating a plurality of private table seeds as a function of a plurality of predetermined parameters;
    means for generating a plurality of private tables as a function of said private table seeds, wherein each of said plurality of private tables associates with a distinct one of said plurality of private table seeds, each of said private tables associating with a predetermined site within said at least one enterprise;
    means for generating at least one enterprise table seed as a function of said plurality of predetermined parameters;
    means for generating an enterprise table as a function of said at least one enterprise table seed, said enterprise table associating with said predetermined enterprise for permitting communication of data throughout said predetermined enterprise;
    means for establishing a string of characters for accessing a global private information protection system, said global information protection system comprising a plurality of global tables;
    means for integrating said private tables, said enterprise tables, and said global tables into a runtime application program at a remote location; and
    means for coordinating the use of said private tables, said enterprise tables, and said global tables to allow use of a predetermined set of protected information, thereby providing for the secure use and preventing inadvertent disclosure of said predetermined set of protected information.

* * * * *